Dec. 14, 1926.

G. McKITTRICK 1,610,302

SUN SHIELD FOR THE DOORS OF CLOSED CARS

Filed Oct. 31, 1925

Inventor
G. McKittrick,

By Clarence A. O'Brien.
Attorney

Patented Dec. 14, 1926.

1,610,302

UNITED STATES PATENT OFFICE.

GEORGE McKITTRICK, OF INDEPENDENCE, KANSAS.

SUN SHIELD FOR THE DOORS OF CLOSED CARS.

Application filed October 31, 1925. Serial No. 66,005.

This invention relates to sun shields for motor vehicles, and has more particular reference to a construction for association with the upper portion of the doors in their window openings, in order that the light rays from the sun will not pass directly upon the occupants of the car and particularly the driver thereof, which interferes with the occupant's vision and in the proper manipulation of the vehicle.

The primary object of the invention is to provide a sun shield that may be incorporated directly within the door window opening without marring the doors and without affecting the operation of the sliding window panels therein, and also such a shield that will materially add to the appearance of the car.

With the foregoing and other objects in view as the nature of the invention will be better understood, the following specification when considered with the accompanying drawing wherein:—

Figure 1:
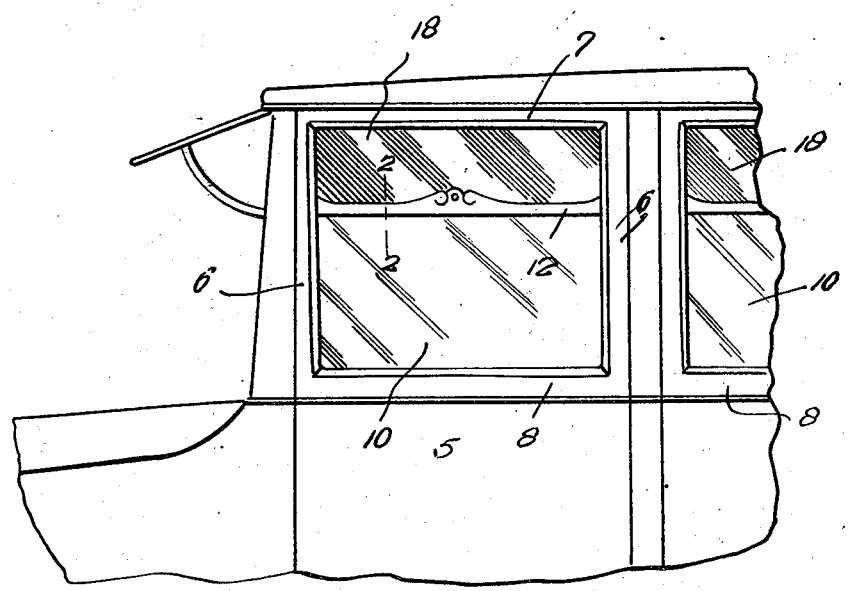
Figure 2:
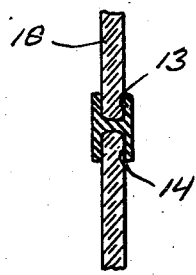
Figure 3:
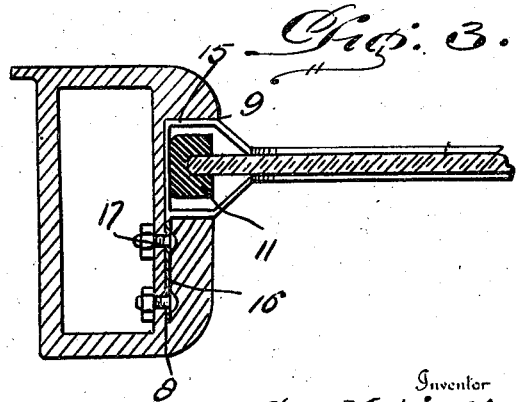

Figure 1 is a fragmentary side elevational view of a conventional type of closed automobile to one or more of the doors of which is associated my improved sun shield, Fig. 2 is a section taken substantially upon the line 2—2 of Fig. 1, and Fig. 3 is an enlarged detailed section thru one of the door window frame bars for more clearly disclosing the construction of my improved sun shield.

Now having particular reference to the drawing, 5 indicates a door of a conventional type closed car that is so constructed at its upper end as to provide a window frame including side bars 6—6, and a top and bottom bar 7 and 8 respectively.

The conventional construction of the side bars 6—6 is as shown in Fig. 3, the same being rabbeted at their inner edges as at 8 at the forward sides thereof for providing a shoulder 9 at their inner side. Vertically slidable in the frame and through the door, is the usual glass panel 10, the opposite ends of which move within the grooves of conventional packing strips 11 that are secured to the frame bars in a well known manner.

My invention per se, constitutes the provision of a cross bar 12 of desirable material that is relatively H-shaped in cross section as per Fig. 2, for providing channels 13 and 14 at its upper and lower edges respectively.

This cross bar 12 is disposed horizontally between the side frames of the frame construction in predetermined spaced relation with the upper end thereof.

The opposite end of said bar 12 is formed with boxing of the character shown in Fig. 3, and designated 15, that engage within the rabbets of the frame bars and in tight engagement with the previously mentioned shoulders 9 of the said frame bars and through which extend the packing strips 11.

Each of the boxings 15 is formed with forwardly extending strips 16 flush with the rear wall thereof that closely engage the side of the respective window frame bar 6 and are there secured through the medium of bolts and nut connections, or any other suitable connections 17.

Stationarily arranged in the upper portion of the window frame between the top bar 7 and the cross member 12 of my invention is a strip of colored glass 18, the lower edge of which rests within the channel 13 of said cross member, and obviously prevents the glaring rays of the sun and other bright lights from entering the vehicle at the upper portion thereof and consequently impairing the vision of the occupants of the vehicle.

When the usual window pane 10 of the door is in the closed position as shown in Figs. 1 and 2, the upper edge will engage within the lower channel of the cross member 12 for providing a water-tight joint between the edges of the panel.

It will thus be seen that I have provided a highly novel and efficient glare shield for vehicles, and one that may be readily associated with the doors of practically all types of closed machines, and one whose construction is such as to considerably enhance the beauty of the machine.

Even though I have herein shown and described the most preferred embodiment of the invention with which I am at this time familiar, it is nevertheless to be understood that minor changes may be made in the invention without departing from the spirit and scope of the appended claims.

Having thus described my invention, what I claim as new and desire to secure by Letters-Patent is:—

1. As a new product of manufacture, a window including a frame and a closure for said frame, said closure being composed of a lower transparent section and an upper translucent section, and a parting strip between said sections, said parting strip being formed with upper and lower channels for reception of the adjacent edge portions of said closure sections, said parting strip being further formed at its ends with means for reception in the usual grooves in the vertical frame bars, and means whereby the first named means may be detachably connected with said frame bars, whereby to permit easy replacement of the closure sections.

2. As a new article of manufacture, a special parting strip for permitting sectional panes to be mounted in a window frame, said parting strip embodying an upper channel and a lower channel for reception of the respective edge portions of the window pane sections, said parting strip being provided at each end with a hollow boxing to accommodate a packing strip and to fit snugly in a groove in one of the frame bars, said boxing being also provided with an outward extension serving as an attaching part, whereby to permit the parting strip to be firmly secured in place.

In testimony whereof I affix my signature.

GEORGE McKITTRICK.